I. S. RAYMER.
GRAIN OR HAY LOADER.
APPLICATION FILED JAN. 7, 1914.
1,175,296.
Patented Mar. 14, 1916.
4 SHEETS—SHEET 1.
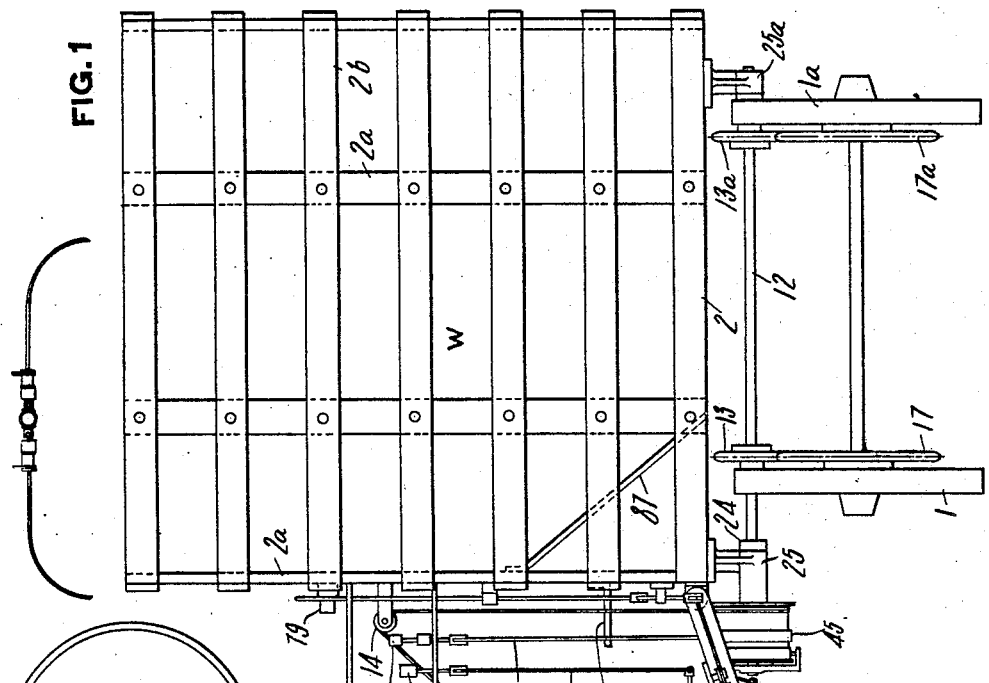
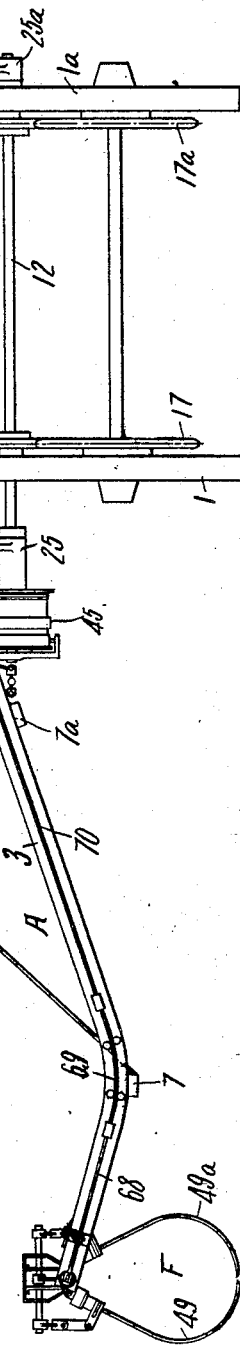
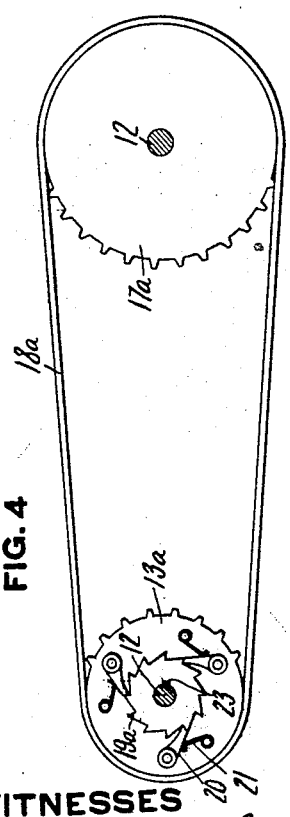
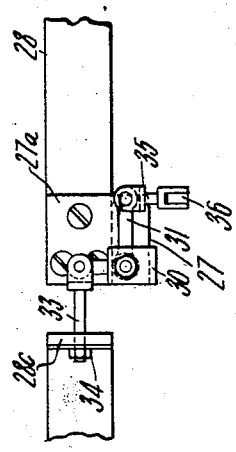
WITNESSES
W. T. Holman
G. Herman Wegner
INVENTOR
Ara S. Raymer
by A. L. Vencill
his attorney

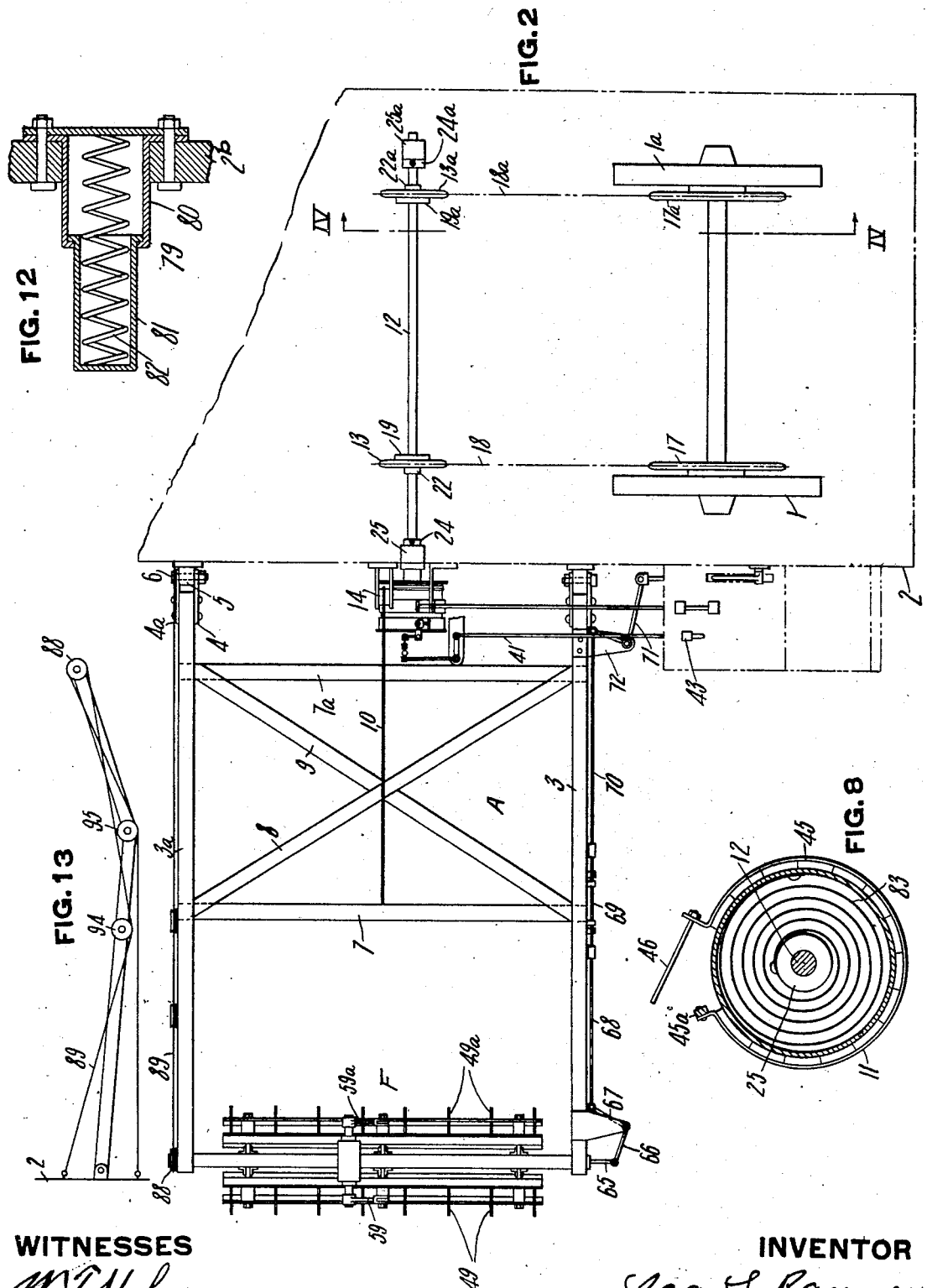

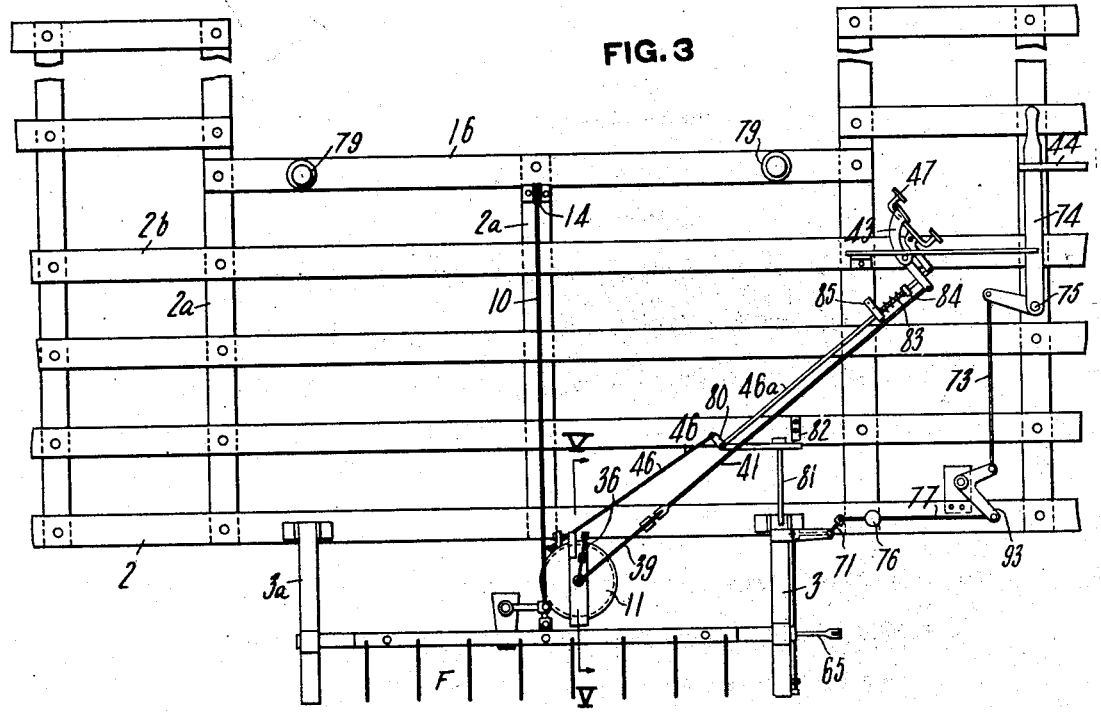
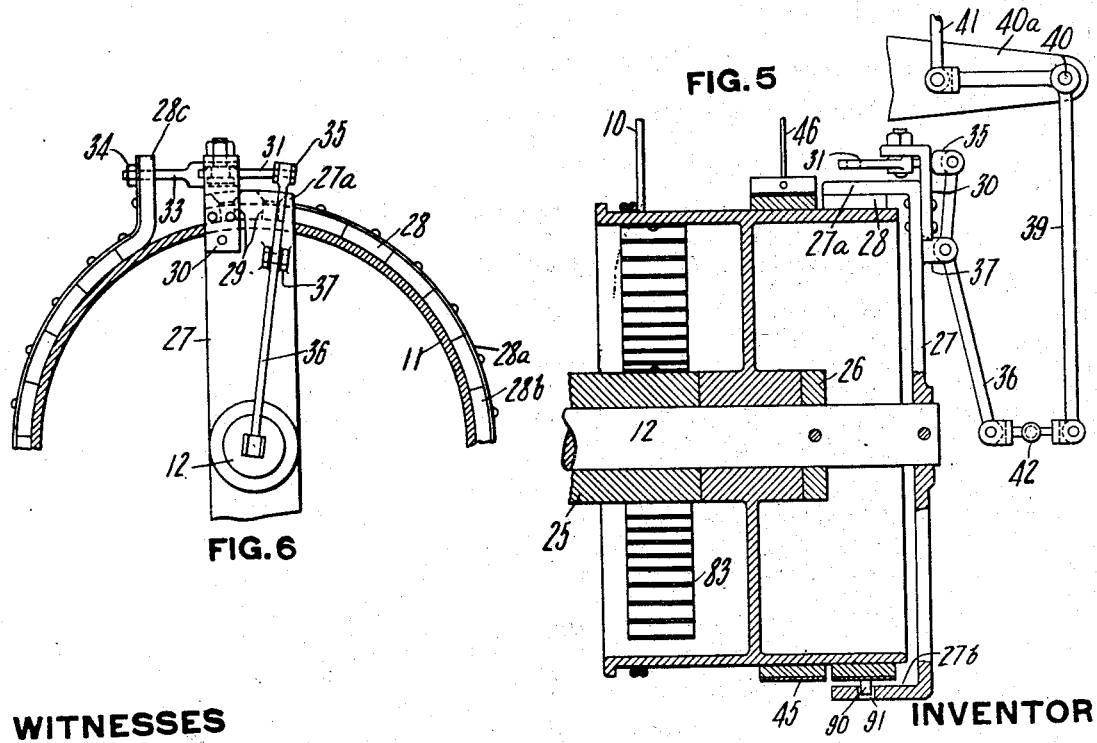

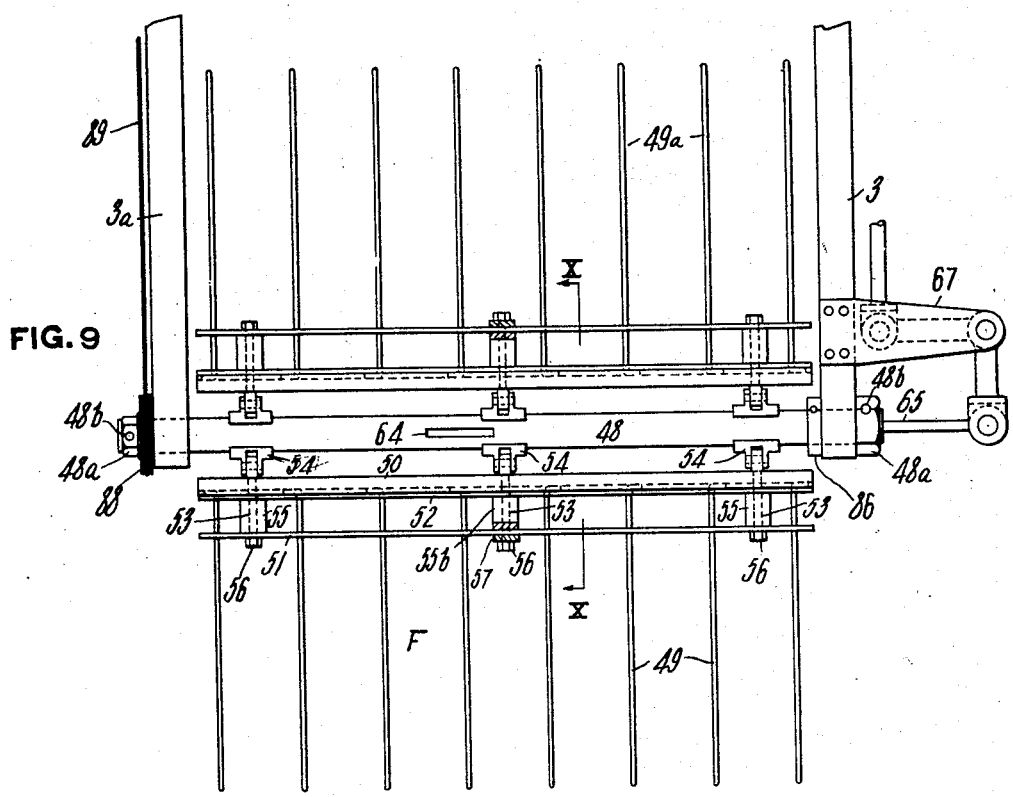

UNITED STATES PATENT OFFICE.

IRA S. RAYMER, OF BEAVER, PENNSYLVANIA.

GRAIN OR HAY LOADER.

1,175,296.  Specification of Letters Patent.  Patented Mar. 14, 1916.

Application filed January 7, 1914. Serial No. 810,728.

*To all whom it may concern:*

Be it known that I, IRA S. RAYMER, a citizen of the Dominion of Canada, residing at Beaver, in the county of Beaver and State of Pennsylvania, have invented certain new and useful Improvements in Grain or Hay Loaders, of which the following is a specification.

My invention relates to loaders for hay and grain, and particularly to loaders of this type adapted for use in connection with wagons or other vehicles.

I will describe one form of loader embodying my invention, and will then point out the novel features thereof in claims.

In the accompanying drawings, Figure 1 is a view showing in rear elevation a wagon having applied thereto one form of loader embodying my invention. Fig. 2 is a top plan view of the loader and part of the wagon shown in Fig. 1. Fig. 3 is a side view of the wagon and loader shown in the preceding views. Fig. 4 is a sectional view on the line IV—IV of Fig. 2 looking in the direction of the arrows. Fig. 5 is a sectional view on the line V—V of Fig. 3 looking in the direction of the arrows. Fig. 6 is a view looking at the right-hand side of the apparatus shown in Fig. 5. Fig. 7 is a view looking down on the top of a portion of the apparatus shown in Figs. 5 and 6. Fig. 8 is a view looking at the left-hand side of the apparatus shown in Fig. 5. Fig. 9 is a top view of the fork F shown in Figs. 1, 2 and 3 drawn to a larger scale, part of the fork operating mechanism being omitted for the sake of clearness, and the fork being shown in the open position. Fig. 10 is a sectional view on the line X—X of Fig. 9. Fig. 11 is a sectional view on the line XI—XI of Fig. 10. Fig. 12 is a view showing in longitudinal cross-section a spring buffer 79 shown in Figs. 1 and 3. Fig. 13 is a view showing the opposite side of bracket A to that shown in Fig. 1, the fork F being removed.

Similar reference characters refer to similar parts in each of the views.

Referring first to Figs. 1, 2 and 3, the reference character W designates a wagon, or other vehicle, comprising wheels 1 and $1^a$, and a rack 2 adapted to hold hay or grain. The rack 2 as here shown comprises upright posts $2^a$ to which are fixed horizontal slats $2^b$. Mounted on the wagon is a swinging bracket A which carries at its outer end a fork F adapted to pick up hay or grain. The movement of the bracket A is such that the fork F swings from the ground to a position over the rack 2, so that hay or grain may be transferred from the ground to the rack. Preferably the fork F does not rise far above the top of the rack 2, but enters the rack through a notch 16 (see Fig. 3) in the side of the rack, so that when the fork is located over the rack the wagon may enter a barn door which is only a little higher than the top of the rack. The fork F is shown in Fig. 1 in both of its extreme positions, that is, resting on or near the ground, and over the rack 2; it is shown closed in the former position and open in the latter. The bracket A comprises, as here shown, two arms 3 and $3^a$, each of which is bent into substantially the shape shown in Fig. 1. These arms are preferably of wood bent into the desired shape by the well known steam process, although they may equally well be made of other suitable material. Each arm is pivotally mounted to swing vertically on the wagon by means of a bolt 6 (see Fig. 2) which passes through a hole in a lug 5 fixed on the wagon and also through holes in iron plates 4 and $4^a$ fixed to the ends of the arms. The bracket A is completed by suitable struts 7, $7^a$, 8 and 9 fixed to the arms so that the arms are constrained to swing as one integral piece.

The fork F is mounted in the outer ends of arms 3 and $3^a$ in such manner that it always hangs vertically regardless of the position of the bracket. The fork and the means for opening and closing it will be hereinafter explained.

The bracket A may be raised from the ground by one or more ropes which latter are adapted to be wound on a drum operated by a wheel or axle of the wagon. As here shown, one rope 10 is provided, which rope is secured to the strut 7 and passes upwardly and over a pulley 14 mounted on the side of the wagon. This rope 10 then passes directly downward and winds on a drum 11, one end of the rope being fixed to this drum. Because of the outward stress executed by the rope 10 on pulley 14, the upright post $2^a$ to which this pulley is attached is preferably braced by a guy rod 87 as shown in Fig. 1.

The drum 11 may be connected with and disconnected from the wheels 1 and $1^a$ of the wagon in the manner which I will now explain. Referring particularly to Figs. 2 and 4, a shaft 12 is mounted in bearings 25 and 25ᵃ on the under side of the rack 2, and is prevented from longitudinal movement by two collars 24 and 24ᵃ, fixed to the shaft and located adjacent the bearings. Two sprocket wheels 13 and 13ᵃ are mounted on this shaft to ride freely thereon and are connected by chains 18 and 18ᵃ with two other sprocket wheels 17 and 17ᵃ fixed to the wheels 1 and 1ᵃ respectively. Fixed on the shaft 12 adjacent each of the sprocket wheels 13, 13ᵃ is a ratchet wheel 19 or 19ᵃ, these ratchet wheels being fixed to the shaft by keys 23. Ratchet wheel 19ᵃ coacts with several pawls 20, three in number as here shown, which are pivotally mounted on the adjacent face of sprocket wheel 13ᵃ and each of which is biased to engagement with the teeth of the ratchet wheel by suitable means such as a spring 21 one end of which is fixed to the sprocket wheel and the other end of which presses on the pawl. Sprocket wheel 13 and ratchet wheel 19 are provided with similar pawls which are not shown in the drawings. The pawls and ratchet wheels are so arranged that the shaft 12 is driven by the wagon wheels 1 and 1ᵃ while the wagon is moving forward, but that while the wagon is backing, the pawls ride idly on the ratchet wheels and therefore do not drive shaft 12. It will be seen also that with this construction, while the wagon is going around a turn, the outside wagon wheel, which turns faster than the inside wheel, drives the shaft 12 while the pawls on the ratchet wheel which is connected with the inside wagon wheel ride idly over their adjacent ratchet wheel. The sprocket wheels 13 and 13ᵃ are prevented from longitudinal movement on the shaft 12 by the ratchet wheels 19 and 19ᵃ which are fixed on the shaft as before mentioned, and by collars 22 and 22ᵃ which are also fixed on the shaft.

Referring now to Figs. 2, 5, 6, and 7, I will explain the means here shown for controlling the drum 11. This drum is mounted freely on the shaft 12, and is restrained from longitudinal movement thereon by a collar 26 and by the bearing 25 one end of which extends to the hub of the drum. Fixed to the shaft 12 is a diametrically disposed arm 27 both ends of which are bent at right angles to form tongues 27ᵃ and 27ᵇ which project over the periphery of the drum. The periphery of the drum near one end is surrounded by a clutch band 28 which is similar to a dynamometer band, and comprises a flexible metal ribbon 28ᵃ to which are riveted or screwed a number of bars 28ᵇ of wood or other friction material which bear on the periphery of the drum. One end of this band is secured to the under side of tongue 27ᵃ, by screws 29, the tongue being at such distance from the periphery of the drum that the band does not bear with friction on the drum at this point. The other end of the band 28 terminates in a block 28ᶜ which is upturned as shown in Fig. 6, by means of which the band may at times be drawn tightly around the face of the drum. It will be seen that when the band 28 is loose on the drum, the shaft 12 and the arm 27 may rotate while the drum remains at rest, but that when the band is drawn tightly around the drum the drum is clutched to the arm 27 and is thereby caused to rotate with the shaft. The band 28 is retained in place on the drum at its ends by the tongue 27ᵃ and by the connections to the block 28ᶜ; it is further retained in place midway between its ends by a pin 90 which fits loosely in a slot 91 in tongue 27ᵇ.

The clutch band 28 is controlled by means which I will now explain. Fixed on arm 27 is a crank bearing 30 in which is pivoted a crank 31, one arm of which projects over the drum 11 and is pivotally connected with a jaw bolt 33. This jaw-bolt passes freely through a hole in the terminal block 28ᶜ, and is provided with a nut 34 on the outside of the terminal block. The other arm of crank 31 is pivotally connected with one end of a double jaw member 35, the two jaws of which are disposed at a suitable angle, and the other end of which is pivotally connected with one end of a crank 36 which is pivotally mounted intermediate its ends in a bearing formed by lugs 37 on the arm 27. The other end of crank 36 is provided with a hole located exactly opposite the center of shaft 12, and by means of a pin in this hole the crank is pivotally connected with one end of a swivel 42 the other end of which is connected with one arm of a crank 39. This crank 39 is pivoted at point 40 to a bracket 40ᵃ on the wagon, and the other arm of the crank is connected with a rod 41 which extends upwardly and is connected with a foot pedal 43 which may be manipulated by an operator occupying a seat 44.

It will be seen from the foregoing that normally the drum 11 is disconnected from shaft 12, but that it may be connected to rotate with the shaft by pressing the pedal 43. The pressing of this pedal raises rod 41, thereby pressing the vertical arm of crank 39 inwardly toward the end of shaft 12; this causes the outer end of crank 36 to move outwardly, thereby swinging crank 31 in such direction that nut 34 draws the band 28 tightly around the drum 11. Owing to the swivel 42, this control of the clutch band may be accomplished regardless of the rotation of the shaft 12.

As seen in Fig. 5, the clutch band 28 occupies only a portion of the width of the periphery of drum 11. The other end of the drum is occupied by the rope 10, the end of which is fixed to the drum, so that when the shaft is rotating and the shaft and drum are clutched together, the rope is wound on the drum and the bracket A is raised.

Located on the drum 11, between the clutch band and the rope is a brake 45 by means of which the downward movement of bracket A may be retarded. Referring to Fig. 8, this brake comprises a band surrounding the drum and provided with bars of friction material similar to the clutch band already described. One end of the brake band is secured to a bracket 45$^a$ mounted on the side of the wagon, and the other end of the band is connected with a rod 46 which extends upwardly and is controlled by a foot pedal 47 (see Fig. 3) through connections which I will now explain. The upper end of rod 46 is connected with one end of a lever 80, which lever, at a point intermediate its ends, is pivotally connected with another rod 46$^a$. The other end of lever 80 is provided with a hole through which passes freely a rod 81, which extends downwardly and is pivotally connected with arm 3 of bracket A. The upper end of rod 81 is provided with an enlarged head, preferably a nut adjustable on the rod, which at times engages the lever 80 to pull the long arm of the latter downwardly. The upward movement of the long arm of the lever is limited by a stop 82 fixed on one of the slats 2$^b$. Rod 46$^a$ extends upwardly and is connected with the pedal 47, which latter is adapted to be swung in opposite directions from a middle position. Rod 46$^a$ is acted upon by a coiled spring 83, one end of which bears on a collar 84 fixed to the rod, and the other end on a fixed stop 85.

The operation of the brake and its controlling apparatus is as follows: When the bracket A is in its raised position, rod 81 is raised so that lever 80 may rest against stop 82. In order to hold the bracket in this position the operator presses with his toe upon the upper end of pedal 47, thereby pulling upwardly on rod 46$^a$; the stop 82 is then acting as a fulcrum for lever 80 so that rod 46 also is pulled upwardly, thereby applying the brake 45. When the operator desires to allow the bracket to descend he releases the pedal 47, thereby releasing the brake, and he can control the speed of the bracket at will, and may stop it at any point in its descent, by pressing the upper end of the pedal as before. As the bracket A approaches the ground, the downward movement of rod 81 draws lever 80 away from stop 82. If the operator does not manipulate the pedal, this movement of lever 80 causes rod 46$^a$ to be drawn downwardly and rod 46 to be drawn upwardly, thereby applying the brake with gradually increasing force. The tension on the brake rod 46 is constantly such as to balance the pressure of spring 83. The parts are so adjusted that without attention by the operator the brake will stop the bracket before the fork F touches the ground; this result may be secured by properly adjusting the head on rod 81 and by properly adjusting the compression of spring 83. Then after the bracket has been thus stopped automatically, it may be released to continue to the ground by pressing the lower end of pedal 47, thereby compressing spring 83 still further and allowing lever 80 to swing around the head on rod 81 as a fulcrum and so allowing rod 46 to move downwardly to release the brake. When the bracket is to be raised again, the operator first releases the brake as just described, and then operates the clutch pedal as explained hereinbefore.

Referring now particularly to Figs. 9, 10 and 11, the fork F is carried by a cylindrical tubular casing 48 of iron or wood mounted to oscillate freely in the ends of the bracket arms 3 and 3$^a$. The ends of this casing are threaded to receive nuts 48$^a$ which are screwed up to such points as to hold the casing in place in the arms and yet permit it to turn freely therein, and are then fixed in place by cotter pins 48$^b$. The casing is preferably further held in place by a collar 86 fixed thereon by a cotter pin and located adjacent the arm 3. The fork comprises two sets of prongs 49 and 49$^a$ mounted to have relative movement so that the fork may be opened and closed. The prongs 49 are carried by a channel bar 50 and a bar 51, and the prongs 49$^a$ are similarly carried by a channel bar 50$^a$ and a bar 51$^a$. The channel bar 50 and bars 51 are suitably carried by casing 48 as hereinafter explained. As here shown, the inner end of each fork prong is bent at a right angle and rests in the channel of bar 50 or 50$^a$ so that the prong is prevented from turning. The prongs 49 are retained in place in the channel bar 50 by a plate 52 which covers the channel, and prongs 49$^a$ are similarly retained in place by a plate 52$^a$. The bars 51, 51$^a$, 52 and 52$^a$ are, of course, provided with holes through which the prongs pass. The channel bar 50 and the bars 51 and 52 are pivotally mounted on the casing 48 by means of three eye-bolts 53 which pass through holes in the bars and are mounted to swing in vertical planes in lugs 54 fixed on the outside of casing 48. The plates 51 and 52 are separated at a suitable distance by sleeves 55 on the two end bolts, and the channel bar and the two plates are held in place on the eye-bolts by nuts 56 screwed on the projecting ends of the bolts. The channel bar 50$^a$ and the plates 51$^a$ and 52$^a$ are mounted to swing on casing 48 by similar means. The vertical swing of the eye-bolts 53 and 53$^a$ in the lugs 54 and 54$^a$ permits the fork F to open and close, the fork being shown in its two positions in Fig. 1.

The opening and closing of the fork F is controlled by means which I will now explain. The sleeve 55$^b$ on the middle eye-bolt 53 does not occupy the entire space between the plates 51 and 52, but is short enough to permit of the insertion of one leg of one jaw of a double jaw member 57, the two jaws of which member are at right angles to each other. As here shown, the lower jaw of this member straddles the bar 51. Pinned in the upper jaw of member 57 is a link 58. Eyebolt 53$^a$ is similarly connected with a link 58$^a$ through the medium of a similar double jaw member 57$^a$. The upper ends of the links 58 and 58$^a$ are connected respectively with two horizontally disposed crank arms 59 and 59$^a$ which are fixed on the ends of a shaft 60 mounted on the casing 48. The connection between link 58 and arm 59 comprises a jaw-and-eye member 92, the jaw and eye of which are disposed at right angles; and the connection between link 58$^a$ and arm 59$^a$ comprises a similar jaw-and-eye member 92$^a$. The shaft 60 is mounted to oscillate in a bracket 61 which is fixed on the casing 48 and is steadied in position by an inside bracket 62. Fixed to the shaft 63 at about the middle thereof is a crank arm 63 which projects downwardly through a slot 64 in the casing 48 and which is pivotally connected with a rod 65 which extends to, and projects out of, one end of the casing. This rod includes a swivel 78, which permits the casing 48 to oscillate independently of the apparatus connected with the outer end of rod 65. Connected with the outer end of this rod 65 (see Fig. 2), is one arm of a crank 66 mounted in a bracket 67 fixed on arm 3, and the other end of which crank is connected with a rod 68. The rod 68 is connected with another rod 70, (see Figs. 2 and 1) by a deflecting device 69 comprising a curved rod sliding between rollers mounted on the arm 3. The rod 70 is connected with one arm of a crank 71 mounted in a bracket 72 on arm 3, the other end of which crank is connected through a swivel 76 (see Fig. 3) with a rod 77. Rod 77 connects with one arm of a crank 93 mounted on the box 2, the other arm of which is connected by a rod 73 with a hand lever 74 pivotally mounted at point 75 on the box 2, which lever is within easy reach of the operator occupying the seat 44.

The operation of the fork F is as follows: Assuming that the prongs 49 and 49$^a$ are in the closed position, as shown in the lower left-hand corner of Fig. 1. When the operator desires to open the fork, he pushes the upper end of lever 74 toward the front of the wagon (to the left as viewed in Fig. 3) thereby pulling rod 65 outwardly from the casing 48. This raises links 58 and 58$^a$, thereby raising the prongs and opening the fork, causing it to discharge its load. This operation of the fork may be accomplished regardless of the position of the bracket A, and the movement of this bracket causes no interference with the fork operating mechanism because of the swivel 76, this swivel and the rod 77 being in alinement with the center of oscillation of the bracket A. Furthermore, the swinging of the fork in the bracket A causes no interference with the fork operating mechanism, because of the swivel 78 in rod 65.

It will be seen from Fig. 1, that when the bracket A is in the extreme upper position of its stroke, so that fork F is over the rack 2, the center of gravity of the bracket and fork is on the wagon side of the bolts 6 on which the bracket swings. Hence, unless suitable starting means are provided the bracket might remain in this upper position when the brake 45 is released. To insure that the downward movement of the bracket will begin, I preferably provide one or more spring buffers 79 on the side of the wagon box, which buffers engage the arms 3 and 3$^a$. These buffers are compressed when the bracket rises, and they therefore give the bracket an impulse tending to swing it outwardly from the wagon when the brake is released. One of these buffers is illustrated in section in Fig. 12, and as here shown comprises two telescoping cylinders 80 and 81, the former of which is secured to a horizontal slat 2$^b$ and the latter of which is engaged by the bracket A. The cylinders are normally distended by a spring 82 which is compressed when the bracket exerts pressure on cylinder 81.

Unless means were provided to take up slack in the rope 10, this rope would unwind from the drum 11 while the bracket is at rest, because the drum is loose on shaft 12. To prevent this, I preferably provide a coiled spring 83 (see Figs. 5 and 8) located under the rim of the drum 11, one end of which spring is fixed to the bearing 25 and the other end to the rim of drum 11. This spring is so adjusted that it exerts a torque on the drum tending to keep the rope 10 taut. This spring comprises a sufficient number of convolutions to prevent its being broken by the rotation of the drum when the bracket A is being raised and lowered.

The fork F, as has been explained, is mounted to swing freely in a vertical plane in bracket A, and unless suitable constraining means are provided, the fork might not always hang vertically in the bracket. To insure the proper vertical position of the fork at all times, I preferably provide a pulley 88 fixed on the casing 48 (see Figs. 9 and 13) around which passes a rope 89. This rope is guided by pulleys 94 and 95 mounted on the arm 3$^a$, and its ends are fixed to the rack 2 below and above the pivotal point of the arm. As shown in Fig. 13, the rope and pulleys are so arranged that as the bracket A swings on its pivots the pulley 88 is turned to keep the fork F vertical at all times.

Although I have herein shown and described only one form of loader embodying my invention, it is understood that various changes and modifications may be made therein within the scope of the appended claims without departing from the spirit and scope of my invention.

Having thus described my invention, what I claim is:

1. In combination, a vehicle, a bracket mounted thereon to move relatively thereto, a fork carried by the bracket and movable relatively thereto, the movement of the bracket being such that the fork swings between the ground and a position over the vehicle, and means for constraining the fork to hang vertically while the bracket occupies any position in its range of movement.

2. In combination, a vehicle, a bracket mounted thereon to have movement relatively thereto, a fork carried by the bracket, the movement of the bracket being such that the fork moves from the ground to a position over the vehicle, means for raising said bracket, automatic braking means controlled by the bracket for arresting the downward movement of the bracket before the latter reaches the ground.

3. In combination, a vehicle, a bracket mounted thereon to have movement relatively thereto, a fork carried by the bracket, the movement of the bracket being such that the fork moves from the ground to a position over the vehicle, means for raising said bracket, automatic braking means controlled by the bracket for arresting the downward movement of the bracket before the latter reaches the ground, and manually controllable means for releasing the bracket to allow it to continue its movement to the ground.

4. In combination, a body, a member movable with relation thereto, a brake for controlling the movement of said member in one direction, a rod for controlling said brake, and adapted when pulled to cause application of the brake, a lever one end of which is connected with said brake rod, a second rod connected with said lever intermediate the ends of the latter, a fixed stop for limiting the movement of the other end of the lever due to a pull on the second rod, a spring acting on said second rod tending to hold the lever against said stop, means controlled by the movable member when the latter reaches a given position for acting on the last-mentioned end of said lever to pull it away from said stop thereby exerting a pull on both of said rods and causing automatic application of the brake, and means for pushing and pulling said second rod; whereby when the rod is pushed the automatic brake application will be prevented or relieved, and whereby when the rod is pulled the brake will be applied at any point in the movement of said movable member.

5. In combination, a bracket mounted to oscillate in a vertical plane and comprising two spaced arms, a casing mounted in said arms and free to oscillate relatively thereto, and a fork suspended from said casing, whereby the fork may at all times hang vertically from said casing.

6. In combination, a vehicle, a bracket mounted thereon to swing in a vertical plane, a horizontally disposed casing carried by the bracket and adapted to oscillate on its longitudinal axis, a fork carried by the casing, a pulley fixed to the bracket, a rope passing over said pulley, the two ends of the rope being fixed to the vehicle above and below the pivotal point of the bracket, the rope and pulley being so adjusted that the fork is constrained to hang vertically as the bracket swings on the vehicle.

7. In combination, a vehicle, a fork mounted thereon to move between the ground and a position over the vehicle, a drum mounted on the vehicle, a rope wound on said drum for controlling said fork, means for rotating said drum to raise the fork, and a spring acting on said drum tending to rotate it in such direction as to raise the fork.

8. In combination, a vehicle, a fork mounted thereon to move between the ground and a position over the vehicle, a drum mounted on the vehicle, means for rotating said drum, clutching means for connecting said drum with and disconnecting it from said rotating means, a rope wound on said drum for controlling said fork, and a spring acting on said drum tending to rotate it in such direction as to raise the fork from the ground.

9. In combination, a vehicle, a bracket pivotally mounted thereon, a casing mounted to oscillate in the bracket, a fork carried by said casing, means carried also by said casing for opening and closing said fork, and means extending from the vehicle along the bracket to said casing for operating said opening and closing means and comprising a swivel joint in the axial line of the bracket pivots and a swivel joint in the axial line of the said casing.

10. In combination, a vehicle, a bracket mounted thereon to move relatively thereto, a fork carried by said bracket, a shaft on the vehicle operatively connected with a wheel thereof, a drum freely mounted on the said shaft, means for clutching said drum to said shaft, a crank pivotally connected with the shaft for controlling said clutching means and having an arm terminating in the axial line of the shaft, a member mounted on the vehicle for moving the said crank arm in the axial line of said shaft, a swivel interposed between the said crank arm and the said member for permitting rotation of the shaft without disturbing the clutch controlling mechanism, and a rope adapted to be wound on the drum for raising the bracket.

11. In combination, a vehicle, a fork carried thereby and movable with relation thereto, a shaft on the vehicle operatively connected with a wheel thereof, a drum freely mounted on the shaft, means carried by the shaft for clutching the drum to the shaft, means extending from the vehicle to said clutching means for the control of the latter and comprising a swivel joint in the axial line of the shaft and a rope adapted to be wound on the drum for raising the fork.

12. In combination, a vehicle, a bracket pivotally mounted thereon, a casing mounted to oscillate in said bracket, a fork carried by said casing, means carried also by said casing for opening and closing said fork, and means extending from said vehicle to said casing for controlling said opening and closing means.

In testimony whereof I affix my signature in presence of two witnesses.

IRA S. RAYMER.

Witnesses:
CHARLES E. BROADBENT,
GEORGE R. BOVARD.